United States Patent
Dopilka et al.

(10) Patent No.: US 8,498,055 B2
(45) Date of Patent: Jul. 30, 2013

(54) SPACE TELESCOPE SYSTEM

(75) Inventors: David J. Dopilka, Glendale, AZ (US);
William Airo, Glendale, AZ (US);
Mitch Fletcher, Glendale, AZ (US)

(73) Assignee: Honeywell International Inc.,
Morristown, NJ (US)

( * ) Notice: Subject to any disclaimer, the term of this patent is extended or adjusted under 35 U.S.C. 154(b) by 347 days.

(21) Appl. No.: 12/856,156

(22) Filed: Aug. 13, 2010

(65) Prior Publication Data
US 2012/0038981 A1    Feb. 16, 2012

(51) Int. Cl.
*G02B 27/14* (2006.01)
*G02B 23/00* (2006.01)
*G02B 27/00* (2006.01)

(52) U.S. Cl.
CPC .......... *G02B 23/00* (2013.01); *G02B 27/0025* (2013.01)
USPC .................................... 359/637; 359/399

(58) Field of Classification Search
USPC ......... 359/399, 363–366, 850–861, 554–556, 359/637
See application file for complete search history.

(56) References Cited

U.S. PATENT DOCUMENTS

| | | | |
|---|---|---|---|
| 4,088,018 A | | 5/1978 | Anderson et al. |
| 4,881,801 A | * | 11/1989 | Gebelein ........................ 359/364 |
| 5,108,168 A | * | 4/1992 | Norbert et al. ................ 359/419 |
| 5,305,981 A | | 4/1994 | Cunningham et al. |
| 5,368,271 A | | 11/1994 | Kiunke et al. |
| 5,485,306 A | * | 1/1996 | Kiunke et al. ................ 359/419 |
| 5,654,549 A | * | 8/1997 | Landecker et al. ........... 250/332 |
| 5,896,228 A | | 4/1999 | Inoue et al. |
| 6,029,959 A | | 2/2000 | Gran et al. |
| 6,454,215 B1 | | 9/2002 | Pedreiro |
| 6,837,586 B2 | * | 1/2005 | Rhoads ......................... 359/872 |
| 6,842,994 B2 | | 1/2005 | McInroy |
| 7,119,954 B2 | * | 10/2006 | Safa .............................. 359/399 |
| 7,270,304 B2 | | 9/2007 | Dailey et al. |
| 7,631,839 B1 | * | 12/2009 | Duncan et al. ............. 244/158.1 |
| 2004/0118231 A1 | | 6/2004 | Peck |
| 2009/0027789 A1 | | 1/2009 | Watters |
| 2010/0020742 A1 | | 1/2010 | Goodzeit et al. |

\* cited by examiner

*Primary Examiner* — Thong Nguyen
(74) *Attorney, Agent, or Firm* — Ingrassia Fisher & Lorenz, P.C.

(57) ABSTRACT

A space telescope system includes, but is not limited to, a support platform configured to orbit astronomical object, a plurality of mirrors mounted to the support platform and spaced apart from one another, the plurality of mirrors being configured to reflect a plurality of focused beams, and a focal plane image combiner positioned to intersect the plurality of focused beams and configured to combine the plurality of focused beams to form a composite image.

19 Claims, 4 Drawing Sheets

SPACE TELESCOPE SYSTEM

TECHNICAL FIELD

The present invention generally relates to a telescope and more particularly relates to a space telescope system.

BACKGROUND

It is desirable to position a telescope in orbit around the earth to obtain clear images of remote targets such as astronomical phenomena. As used herein, the term "telescope" refers to any device that collects, magnifies, or concentrates light and/or electromagnetic radiation received from and/or transmitted to a distant point. When a telescope is positioned in orbit, the light originating from such remote targets can be collected without the distortion that occurs when that light passes through the earth's atmosphere. Accordingly, several telescopes have been placed in orbit around the earth.

Historically, such space telescopes have been mounted on platforms (satellites) whose only purpose has been to serve as a base for mounting such telescopes. Because these platforms serve only this single purpose, they are inertially pointed with respect to the remote target, i.e., these platforms continuously face towards the remote target as they orbit the earth. An inertial platform needs only fine pointing and tracking capabilities to maintain its orientation with respect to the remote target.

Space telescopes typically require routine maintenance. Such maintenance has historically been provided by humans travelling to space for the sole purpose of providing such maintenance. Space travel, however, is expensive. Economic considerations have lead to a reduction in the number of space flights, with further curtailment of spaceflights likely to occur in the future. Accordingly, it is desirable to mount space telescopes on platforms that serve multiple functions so as to reduce or eliminate the need to travel to space on single-purpose maintenance missions.

One solution is to mount a space telescope on an orbiting space station that is continuously populated and/or routinely visited by humans, such as the International Space Station. By using a space station as a mounting platform for a space telescope, the need to conduct single purpose space missions to perform routine maintenance on a space telescope can be eliminated. This is because of the continuous or regular presence of humans on board such a space station who would be available to perform any required maintenance.

Mounting a space telescope on a space station provides an opportunity to increase the amount of light that can be collected. Because of the size of a space station, multiple, spaced-apart, synchronized mirrors can be used to collect light which, in turn, increases the total light collecting area of the space telescope. On earth, telescopes have been designed and constructed that use multiple mirrors that are spaced apart from one another. Each mirror reflects an image in a focused beam to a collector that is positioned to intersect each focused beam and that is designed to combine all the images to form a composite image. Such multi-mirror earth based telescopes are designed and constructed such that the focal length from each mirror to the collector is substantially equal. This ensures that each image reaching the collector is substantially the same size. This, in turn, greatly simplifies the process of combining the multiple images.

Space telescopes having multiple mirrors have not previously been placed in orbit because large platforms capable of supporting multiple mirrors have not been available. A space station would offer a much larger base for mounting mirrors to collect light than any previous orbiting platform. This makes it possible to position multiple collection mirrors around the space station to greatly increase the overall collection area of the telescope. However, because space stations (and/or other large orbiting platforms) are not designed to be telescope platforms, they are not constructed to permit placement of multiple mirrors in a configuration where each mirror has the same focal length to the collector. Thus the image projected by each mirror would be different in size from the image projected by each other mirror when it intersects the collector. Additionally, space stations orbiting the earth (or other planets) are typically nadir pointing (i.e., continuously facing the earth) and, as a result, their orientation with respect to the remote target is continuously changing.

BRIEF SUMMARY

Various non-limiting embodiments of a space telescope system are disclosed herein.

In an embodiment, the space telescope system includes, but is not limited to, a support platform that is configured to orbit an astronomical object, a plurality of mirrors that are mounted to the support platform and spaced apart from one another, the plurality of mirrors being configured to reflect a plurality of focused beams, and a focal plane image combiner positioned to intersect the plurality of focused beams and configured to combine the plurality of focused beams to form a composite image.

In another embodiment, the space telescope system includes, but is not limited to, a support platform that is configured to orbit astronomical object. A first mirror is mounted to the support platform. The first mirror is configured to reflect a first image in a first focused beam. A second mirror is mounted to the support platform. The second mirror is spaced apart from the first mirror and is configured to reflect a second image in a second focused beam. A first focal length compensator is connected to the first mirror and is configured to alter a shape of the first mirror to adjust a first width of the first focused beam. A second focal length compensator is connected to the second mirror and is configured to alter the shape of the second mirror to adjust a second width of the second focused beam. The space telescope system further includes a first focal length adjuster having a first aperture that is positioned to intersect the first focused beam. The first focal length adjuster is configured to adjust a first effective focal length of the first focused beam. The space telescope system further includes a second focal length adjuster having a second aperture that is positioned to intersect the second focused beam. The second focal length adjuster is configured to adjust a second effective focal length of the second focused beam. The space telescope system further includes a focal plane image combiner that is positioned to intersect the first focused beam and the second focused beam after the first focused beam and the second focused beam pass through the first focal length adjuster and the second focal length adjuster, respectively. The focal plane image combiner is configured to combine the first image and the second image into a composite image. The space telescope system further includes a processor that is operatively coupled to the first and the second focal length compensators, to the first and the second focal length adjusters, and to the focal plane image combiner. The processor is configured to control the first focal length compensator to ensure that the first width is sized to fit within the first aperture and to control the second focal length compensator to ensure that the second width is sized to fit within the second aperture. The processor is also configured to control the first focal length adjuster and the second focal length adjuster to adjust the first effective focal length and the second effective focal length, respectively, to render the first effective focal length and the second effective focal length substantially equal to one another. The processor is further configured to control the focal plane image combiner to combine the first image with the second image to yield the composite image.

In another embodiment, the space telescope system includes, but is not limited to, a support platform that is configured to orbit astronomical object. A first mirror is mounted to the support platform. The first mirror is configured to reflect a first image in a first focused beam. A focal plane mast is associated with the first mirror and extends transversely therefrom. A second mirror is mounted to the support platform. The second mirror is spaced apart from the first mirror and is configured to reflect a second image in a second focused beam. A second focal length compensator is connected to the second mirror and is configured to alter the shape of the second mirror to adjust a second width of the second focused beam. The space telescope system further includes a second focal length adjuster having a second aperture that is positioned to intersect the second focused beam. The second focal length adjuster is configured to adjust a second effective focal length of the second focused beam. A focal plane image combiner is mounted on the focal plane mast and is positioned to intersect the first focused beam and to intersect the second focused beam after the second focused beam passes through the second focal length adjuster. The focal plane image combiner is configured to combine the first image and the second image into a composite image. A processor is operatively coupled to the second focal length compensator, to the second focal length adjuster, and to the focal plane image combiner. The processor is configured to control the second focal length compensator to ensure that the second width is sized to fit within the second aperture. The processor is also configured to control the second focal length adjuster to adjust the second effective focal length to be substantially equal to a first focal length that extends from the first mirror to the focal plane image combiner. The processor is further configured to control the focal plane image combiner to combine the first image with the second image to yield the composite image.

BRIEF DESCRIPTION OF THE DRAWINGS

The present invention will hereinafter be described in conjunction with the following drawing figures, wherein like numerals denote like elements.

DETAILED DESCRIPTION

Figure 1:
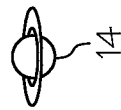
FIG. 1 is a schematic view illustrating an embodiment of a support platform that is nadir pointing and that supports a space telescope system in orbit around the earth.
Figure 1:
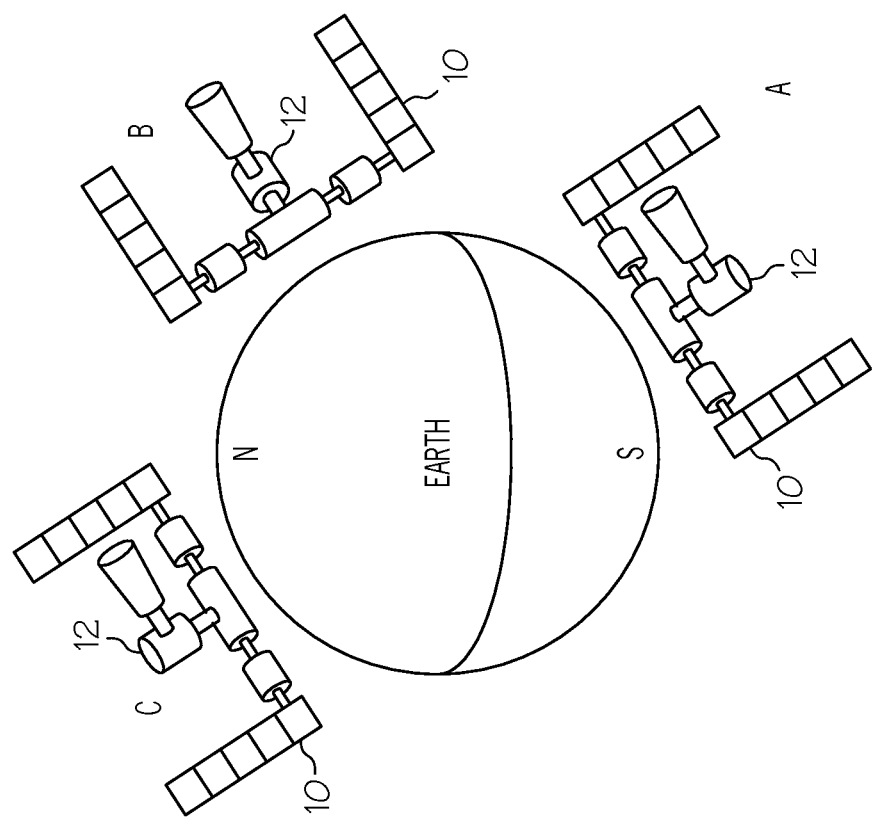

The following detailed description is merely exemplary in nature and is not intended to limit the invention or the application and uses of the invention. Furthermore, there is no intention to be bound by any theory presented in the preceding background or the following detailed description.

An improved space telescope system is disclosed herein that is configured to take advantage of the relatively large size of an orbiting space station or other large orbiting support platform by using multiple mirrors to reflect images from a remote target. Each mirror is positioned in a spaced apart relationship from each of the other mirrors and each is configured to reflect a focused beam to a focal plane image combiner. The focal plane image combiner is positioned to intersect each focused beam. It holds the instrument package's imaging detector at the intersection of the focused beams to form a composite image. Configured in this manner, the space telescope system will have a larger base for collecting light from a remote target than any previously employed space telescope system.

The space telescope system compensates for the nadir pointing orientation of the space station by mounting each mirror to the space station on a mounting assembly that is configured as a two axis gimbal. This permits both azimuth and elevation adjustments of each mirror to be made. Accordingly, each mirror can be slewed to remain trained on the remote target. Each mounting assembly may also include a vibration isolator to isolate the mirror from vibrations, undulations, and other disturbances resulting from day to day operations on board the space station.

The space telescope system may compensate for differences in focal length from each mirror to the focal plane image combiner by equipping each mirror with a focal length compensator and by positioning a focal length adjuster in the path of each focused beam reflected by each mirror. Each focal length compensator is configured to bend its associated mirror to change the shape of that mirror's reflective surface. The reflective surface of each mirror forms an arc having any of several different shapes. For example and without limitation, the arc may be parabolic, hyperbolic, spherical or a combination of the foregoing. By widening or narrowing the arc of each mirror's reflective surface, the width of the focused beam reflected by each mirror can be widened or narrowed as needed to ensure that substantially the entire focused beam fits within an aperture of the focal length adjuster. This, in turn, ensures that substantially the entire image reflected by each mirror is included in the composite image. Each focal length adjuster includes one or more lenses that may be used individually or in combination to lengthen or shorten the distance between each mirror and its focal point, thereby adjusting the effective focal length of each focused beam. The focal length adjusters are used to modify the effective focal length of each focused beam to ensure that all of the focused beams have substantially the same effective focal length. This, in turn, facilitates compilation of the composite image by the focal plane image combiner. Other techniques for addressing the disparity in focal length include isolator translational motion, translation actuators, mirror shaping with a simple lens, and a complex lens arrangement.

The focal plane image combiner can be mounted on a focal plane rotator that is configured to rotate the focal plane image combiner with respect to the mirrors. This permits the focal plane image combiner to keep a substantially constant orientation with respect to the remote target. The space telescope system may also include one or more sensors that are configured to continuously or periodically monitor the orientation of the space telescope system with respect to the remote target to facilitate slewing of the mirrors and rotation of the focal plane image combiner.

One or more processors are included in the space telescope system and is operatively coupled with each of its components to control the slewing of the mirrors to ensure continuous tracking of the remote target. The processor(s) also control the focal length compensators to change the shape of the reflective surface of each mirror. The processor(s) also control the focal length adjusters to modify the focused beam reflected by each mirror so that it will have substantially the same effective focal length as each of the other mirrors. The processor(s) also control the focal plane image combiner to combine the individual images reflected by each mirror into a single, composite image. The processor may also be operatively coupled to one or more vibration isolators that may be employed to isolate each mirror from vibrations emanating from the support platform.

A greater understanding of the embodiments of the space telescope system disclosed herein may be obtained through a review of the illustrations accompanying this application together with a review of the detailed description that follows.

FIG. 1 is a schematic view illustrating a support platform 10 that is nadir pointing and that supports a space telescope system 12 in orbit around the earth. Support platform 10 may be any platform in orbit around the earth (or around any other astronomical object) that is sufficiently large to support two or more spaced apart mirrors for collecting light from a remote target 14. In one embodiment, support platform 10 may comprise the International Space Station that is presently in low earth orbit. In other embodiments, any future space station may be utilized to serve as support platform 10. It should be understood that the appearance of space telescope system 12 has been greatly simplified in FIG. 1. Many components of space telescope system 12, including the use of multiple mirrors, have been omitted from FIG. 1 for ease of illustration.

The nadir-pointing orientation of support platform 10 has been illustrated in FIG. 1 by depicting support platform 10 at different orbital positions during a polar orbit around the earth. At position A, support platform 10 is positioned substantially below the earth's south pole and faces downward towards the earth. In this position, remote target 14 is located to the left of support platform 10 and space telescope system 12 is facing to the left with respect to support platform 10 to collect light from remote target 14.

At position B, support platform 10 is passing over the earth's equator and continues to face in a downward direction towards the earth. As a result of its continued downward orientation with respect to the earth, its orientation with respect to remote target 14 has changed. In this position, remote target 14 is located substantially above support platform 10. To compensate for this changed orientation, space telescope system 12 has been slewed in a clockwise direction with respect to its previous orientation at position A and is now oriented substantially perpendicular to support platform 10.

At position C, support platform 10 is positioned substantially above the earth's north pole and, again, faces downward towards the earth. In position C, remote target 14 is now located to the right with respect to support platform 10. To compensate for this changed orientation, space telescope system 12 has been slewed further in the clockwise direction and now faces to the right with respect to support platform 10 which allows it to continue to collect light from remote target 14. As illustrated in FIG. 1, when mounted to a nadir pointing support platform, space telescope system 12 needs to be mounted in a manner that permits it to slew or to otherwise be adjusted in order to track remote target 14.

Figure 2:
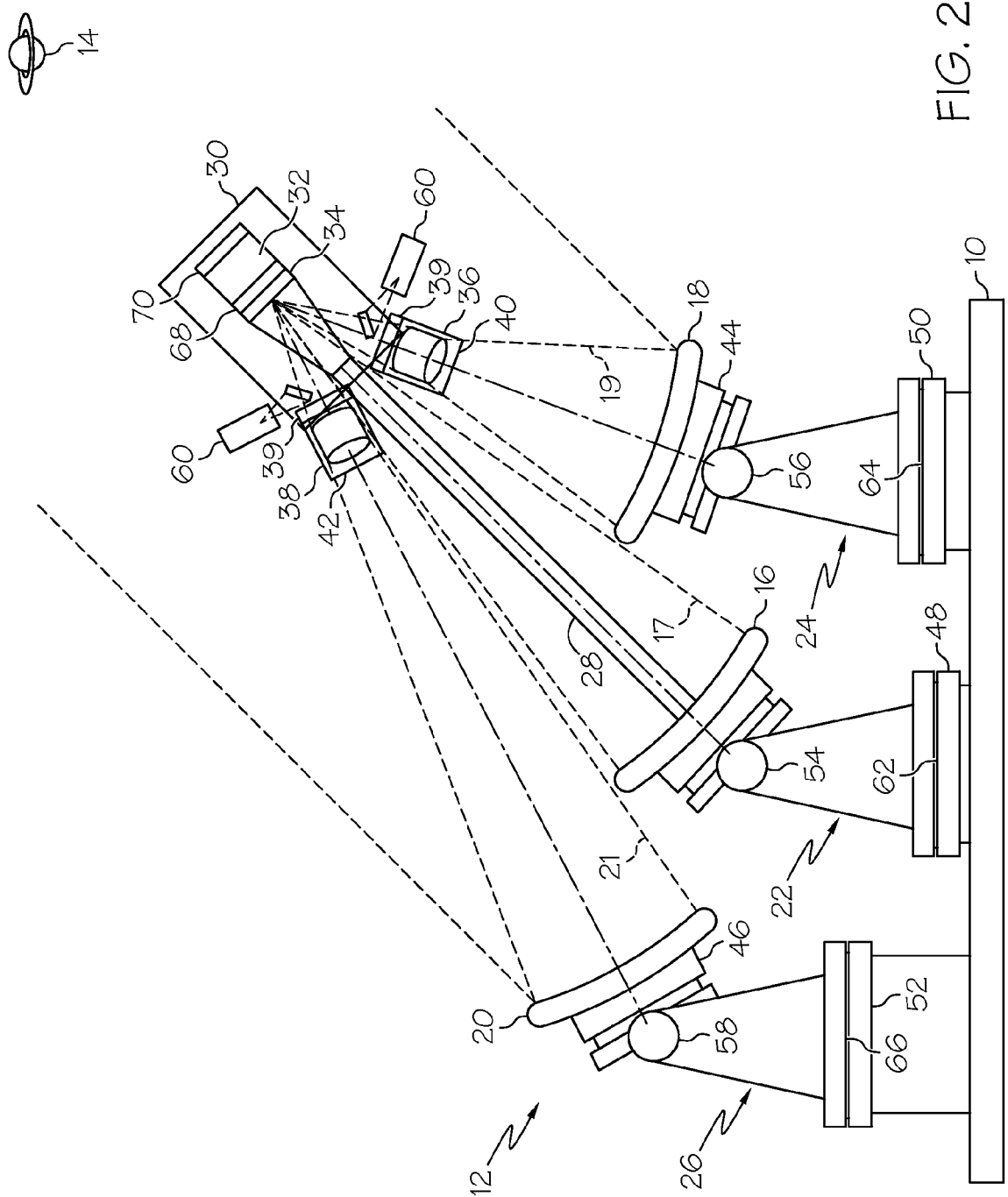
FIG. 2 is a schematic view illustrating an embodiment of a space telescope system made in accordance with the teachings disclosed herein.

FIG. 2 is a schematic view illustrating an embodiment of space telescope system 12. Space telescope system 12 includes a first mirror 16, a second mirror 18, and a third mirror 20 mounted to support platform 10 in a spaced apart relationship from one another. First, second, and third mirrors 16, 18, and 20 are mounted to support platform 10 via a first mounting assembly 22, a second mounting assembly 24, and a third mounting assembly 26, respectively. Each mirror is oriented to receive light originating from remote target 14 and to reflect that light in a focused beam to a single collector, as discussed below. Other embodiments of space telescope system 12 may include a greater or lesser number of mirrors without departing from the teachings herein.

As stated in the background section above, support platform 10 may not have been configured for the purpose of supporting multiple mirrors of a space telescope assembly and, as a consequence, each mirror of the space telescope assembly may have a different focal length from a central collector. Accordingly, first, second, and third mounting assemblies 22, 24, and 26 are illustrated as having different heights to represent placement of the mirrors at different locations around support platform 10 that would result in each mirror having a different focal length.

First, second, and third mirrors 16, 18, and 20 are each illustrated as substantially parabolic reflectors capable of reflecting light in focused beam. As stated above, first, second, and third mirrors 16, 18, and 20, need not be parabolic. They may be configured to have any other suitable shape or combinations of shapes. First mirror 16 reflects first focused beam 17, second mirror 18 reflects second focused beam 19, and third mirror 20 reflects third focused beam 21. Second and third mirrors 18 and 20 are configured to flex or otherwise deform in a manner that changes' their respective focal points, and hence the respective widths of second focused beam 19 and third focused beam 21. In some embodiments, first mirror 16 may also be configured to flex and/or deform in a similar manner.

A focal plane mast 28 extends from an approximate center of first mirror 16. Focal plane mast 28 may be attached directly to first mirror 16 or to first mounting assembly 22 and is configured to extend substantially perpendicularly from first mirror 16. Focal plane mast 28 is configured to maintain this perpendicular relationship with first mirror 16 as first mirror 16 slews. Although focal plane mast 28 has been depicted as a single structural beam extending from an approximate center of first mirror 16, it should be understood that focal plane mast 28 may comprise multiple structural beams, support struts, and/or any other suitable buttress capable of supporting a central collector and associated equipment.

A prime focus assembly 30 is supported on an end of focal plane mast 28. Prime focus assembly 30 houses many of the components that are needed to receive and process the information collected by first, second, and third mirrors 16, 18, and 20. For example, prime focus assembly 30 may house an instrument package 32 which may include a camera that is configured to receive visible light, an ultra violet instrument, an infra red instrument, a high definition video or CCD camera, and any/or other equipment suitable for examining the composite image generated by the space telescope system 12. Other embodiments of space telescope system 12 may not include focal plane mast 28. In such embodiments, a structure mounted to support platform 10 instead of first mirror 16 may be employed to support prime focus assembly 30.

A focal plane image combiner 34 may also be housed in prime focus assembly 30 and positioned to intersect first focused beam 17 at its focal point. Focal plane image combiner 34 is configured to compile, aggregate, and/or otherwise assemble the disparate images reflected by first mirror 16, second mirror 18, and third mirror 20 into a single composite image. Focal plane image combiners are known in the art and are commonly used on earth-based telescopes that employ multiple mirrors to collect light from remote targets. Focal plane image combiners provide the mechanical interface to the instruments of the telescope and may provide focal point adjustments as needed for each instrument.

First, second, and third mirrors 16, 18, and 20 are each configured to reflect an image of remote target 14 to focal plane image combiner 34. Because prime focus assembly 30 is mounted to first mirror 16 via focal plane mast 28, the distance from first mirror 16 to focal plane image combiner 34 will remain constant as first mirror 16 slews to track remote target 14. Because focal plane image combiner 34 is positioned at the focal point of first mirror 16, the image reflected by first mirror 16 on to focal plane image combiner 34 will always be in focus. However, Focal plane image combiner 34 is not positioned at the respective focal points of second mirror 18 and third mirror 20 and consequently their images will not be in focus when intersecting focal point image combiner 34. Furthermore, the distance between second and third mirrors 18 and 20 on the one hand, and focal plane image combiner 34 on the other hand will continuously change as second and third mirrors 18 and 20 slew to track remote target 14. In some instances, these differences in focal lengths may be compensated for by a translation actuator. In other instances, these differing focal points and continuously changing distances may be accommodated by a second focal length adjuster 36 and a third focal length adjuster 38 mounted to prime focus assembly 30. In still other embodiments, translation actuators and focal length adjustors may cooperate to accommodate the differences in focal lengths.

Second focal length adjuster 36 and third focal length adjuster 38 each comprises a lens group that is configured to adjust the effective focal length of second mirror 18 and third mirror 20, respectively. In other embodiments of space telescope system 12 having more than three mirrors, each mirror other than the mirror having the focal plane mast will have an associated focal length adjuster. In embodiments of space telescope system 12 that do include focal plane mast 28, the effective focal lengths of second and third mirrors 18 and 20 may be adjusted with second and third focal length adjusters 36 and 38, respectively, to be substantially equal to the focal length of first mirror 16. As second and third mirrors 18 and 20 are slewed to track remote target 14, their effective focal lengths will be continuously adjusted by second and third focal length adjusters 36 and 38 to ensure that their respective effective focal lengths remain substantially equal to the focal length of first mirror 16. In embodiments of space telescope system 12 that do not include focal plane mast 28, the focal length of each mirror may be adjusted to be substantially equal to any one mirror of the space telescope assembly or to be substantially equal to a mean focal length of all mirrors.

Second focal length adjuster 36 includes a second aperture 40 and third focal length adjuster 38 includes a third aperture 42. Second aperture 40 and third aperture 42 are configured to permit second focused beam 19 and third focused beam 21 to enter second focal length adjuster 36 and third focal length adjuster 38, respectively. Second and third focal length adjusters 36 and 38 are positioned on prime focus assembly 30 such that second aperture 40 and third aperture 42 will intersect second and third focused beams 19 and 21, respectively. Additionally, second and third focal length adjusters 36 and 38 may be mounted to prime focus assembly 30 on gimbals or other mounting mechanism that enable second and third focal length adjusters 36 and 38 to be moved in a manner that corresponds to movement of second and third mirrors 18 and 20. In this way, second aperture 40 and third aperture 42 may be continuously repositioned as required to intersect second and third focused beams 19 and 21, respectively.

A second focal length compensator 44 and a third focal length compensator 46 are also provided to further accommodate the differing focal lengths of second and third mirrors 18 and 20. Second focal length compensator 44 is attached to second mirror 18 and third focal length compensator 46 is attached to third mirror 20. Each focal length compensator is configured to apply a force to its respective mirror that causes the respective mirror to change the shape of its reflective surface. Second and third focal length compensators 44 and 46 may each include one or more links, struts or other components that may retract, extend, rotate or otherwise move in a manner that alters the contours of second and third mirrors 18 and 20. Such change in contour will result in a wider or narrower focused beam reflected by second and third mirrors 18 and 20. Second and third focal length compensators 44 and 46 may be used to adjust the width of second focused beam 19 and third focused beam 21 to ensure that substantially the entire focused beam passes through second and third apertures 40 and 42, respectively.

First, second, and third mounting assemblies 22, 24, and 26 are each configured to permit both the elevation and the azimuth of first, second, and third mirrors 16, 18, and 20 to be adjusted. First mounting assembly 22 includes a first azimuth gimbal 48, second mounting assembly 24 includes a second azimuth gimbal 50, and third mounting assembly 26 includes a third azimuth gimbal 52, each of which permit the azimuth of their respective mirrors to be adjusted. Similarly, first mounting assembly 22 includes a first elevation gimbal 54, second mounting assembly 24 includes a second elevation gimbal 56, and third mounting assembly 26 includes a third elevation gimbal 58, each of which permit the elevation of their respective mirrors to be adjusted. By adjusting the azimuth and elevation of the mirrors of space telescope system 12, the mirrors may be continuously slewed and oriented to track remote target 14 as support platform 10 orbits the earth. Such movement of the mirrors may affect each mirror's distance from the focal plane image combiner. As discussed above, a change in this distance can be compensated for by the focal length compensator and the focal length adjuster associated with each mirror.

A sensor 60 is mounted to second focal length adjuster 36 and to third focal length adjuster 38. Sensor 60 is configured to detect tracking errors in the image that is reflected by one or more of the mirrors of space telescope system 12. A tracking error may consist of detecting a change in the apparent position of remote target 14. Because remote target 14 is relatively immobile, a change in its apparent position is indicative of misalignment of the mirrors with remote target 14. In this way, a detected error can be used to control movement/adjustment of first, second, and third mounting assemblies 22, 24, and 26.

A tip-tilt transmissive element 39 is mounted within second focal length adjuster 36 and third focal length adjuster 38. Tip-tilt transmissive element 39 provides fine tracking and vibration control. Tip-tilt transmissive element 39 includes an optical lens or mirror that can be positioned with high speed and accuracy in two axes (tip and tilt) in response to an error signal generated by a sensor, such as sensor 60. Tip-tilt transmissive elements are also know as "fast steering mirrors" and are used in adaptive optics systems.

First mounting assembly 22 includes a first vibration isolator 62, second mounting assembly 24 includes a second vibration isolator 64, and third mounting assembly 26 includes a third vibration isolator 66. In other embodiments, these vibration isolators may be positioned between the mirror and the elevation gimbal. These isolators are configured to isolate their respective mirrors from vibrations and other movements originating from support platform 10. It is desirable to reduce, eliminate, or cancel out such vibrations before they reach first, second, and third mirrors 16, 18, and 20 to avoid distortions which could occur in the composite image if such vibrations were allowed to freely propagate. First, second, and third vibration isolators 62, 64, and 66 may be any type of vibration isolator that is suitable to shelter the mirrors of space telescope system 12 from vibrations and may include both active and passive isolators.

A focal plane rotator 68 is mounted in prime focus assembly 30 and is attached to focal plane image combiner 34. Focal plane rotator 68 is configured to rotate focal plane image combiner 34. Such rotation can compensate any rotation of support platform 10 with respect to remote target 14 as support platform 10 travels through its nadir pointing orbit of the earth. In this manner, the orientation of focal plane image combiner 34 with respect to remote target 14 can be stabilized.

A processor 70 is mounted in prime focus assembly 30. It should be understood that processor 70 may alternatively be mounted at any other suitable location on space telescope system 12.

Processor 70 may be any type of computer, computer system, microprocessor, collection of logic devices, or any other analog or digital circuitry that is configured to calculate, and/or to perform algorithms, and/or to execute software applications, and/or to execute sub-routines, and/or to be loaded with and to execute any type of computer program.

Processor 70 may comprise a single processor or a plurality of processors acting in concert. In some embodiments, processor 70 may be dedicated for use exclusively with space telescope system 12 while in other embodiments processor 70 may be shared with other systems. In still other embodiments, processor 70 may be integrated with any of the other components of space telescope system 12.

Processor 70 is operatively coupled to first, second, and third mounting assemblies 22, 24, and 26, to second and third focal length compensators 44 and 46, to second and third focal length adjusters 36 and 38, to tip-tilt transmissive elements 39, to focal plane image combiner 34, to focal plane rotator 68, to sensor 60 and to first, second, and third vibration isolators 62, 64, and 66. In some embodiments, processor 70 may also be operatively coupled to instrument package 32. Such operative connections may be effected through the use of any suitable means of transmission including both wired and wireless connections. For example, each component may be physically connected to processor 70 via a coaxial cable or via any other type of wire connection effective to convey electronic signals. In other embodiments, each component may be communicatively connected to processor 70 across a bus or other similar communication corridor. In the illustrated embodiment, processor 70 is wirelessly connected to each of the other components. Examples of suitable wireless connections include, but are not limited to, a Bluetooth connection, a WiFi connection, an infrared connection or the like.

Being operatively coupled with each component provides a pathway for the transmission of commands, instructions, interrogations, and other signals between processor 70 and each of the other components. Processor 70 is programmed and configured to interact with, coordinate with, and/or orchestrate the activities of each of the other components of space telescope system 12 for the purpose tracking remote target 14 and assembling the composite image. For example, in an embodiment, processor 70 is configured to receive inputs from sensor 60 relating to alignment errors between space telescope system 12 and remote target 14. Processor 70 is configured to utilize these inputs to provide azimuth and elevation adjustments to first, second, and third mounting assemblies 22, 24, and 26 to realign first, second, and third mirrors 16, 18, and 20 with remote target 14. Processor 70 may also use inputs from sensor 60 to send commands to tip-tilt transmissive elements 39.

Additionally, based on these azimuth and elevation adjustments and their resulting changes to the distances between second and third mirrors 18 and 20 on the one hand and focal plane image combiner 34 on the other hand, processor 70 is enabled, programmed, and configured to transmit instructions to second and third focal length compensators 44 and 46 to bend second and third mirrors 18 and 20 to either narrow or widen second and third focused beams 19 and 21 as needed to ensure that they will pass through second and third apertures 40 and 42.

In addition, based on the new azimuth and elevation positions of second and third mounting assemblies 24 and 26, processor 70 is enabled, programmed and configured to adjust the positions of second and third focal length adjusters so that they will intersect second and third focused beams 19 and 21. Processor 70 is further enabled, programmed, and configured to adjust second and third focal length adjusters 36 and 38 to provide second and third focused beams 19 and 21 with revised effective focal lengths that are substantially equal to the focal length of first focused beam 17.

Processor 70 is also enabled, programmed, and configured to use the inputs provided by sensor 60 to control the rotation of focal plane image combiner 34. By providing appropriate commands to focal plane rotator 68, processor 70 can rotate focal plane image combiner 34 in a manner that compensates for rotation of support platform 10 with respect to remote target 14. In some embodiments, processor 70 may be further configured to receive inputs from sensors on board support platform 10 corresponding to the orientation of support platform 10 with respect to earth, remote target 14, or some other object. Processor 70 may use inputs from such sensors to provide instructions to focal plane rotator 68.

Processor 70 may also be configured to command focal plane image combiner to combine the individual images from first, second, and third mirrors 16, 18, and 20 to form a composite image. Processor 70 may further be configured to interrupt the process of preparing the composite image until all necessary adjustments have been made to the other components of space telescope system 12 that are needed to compensate for any alignment error detected between space telescope system 12 and remote target 14.

Processor 70 may also be configured to receive inputs from sensors onboard support platform 10 that are configured to detect vibrations propagating through support platform 10. Once such inputs are received, processor 70 may be configured to provide commands to first, second, and third vibration isolators 62, 64, and 66 and also to provide commands to tip-tilt transmissive elements 39 to counteract such vibrations or to otherwise isolate first, second, and third mirrors 16, 18, and 20 from such vibrations.

Figure 3:
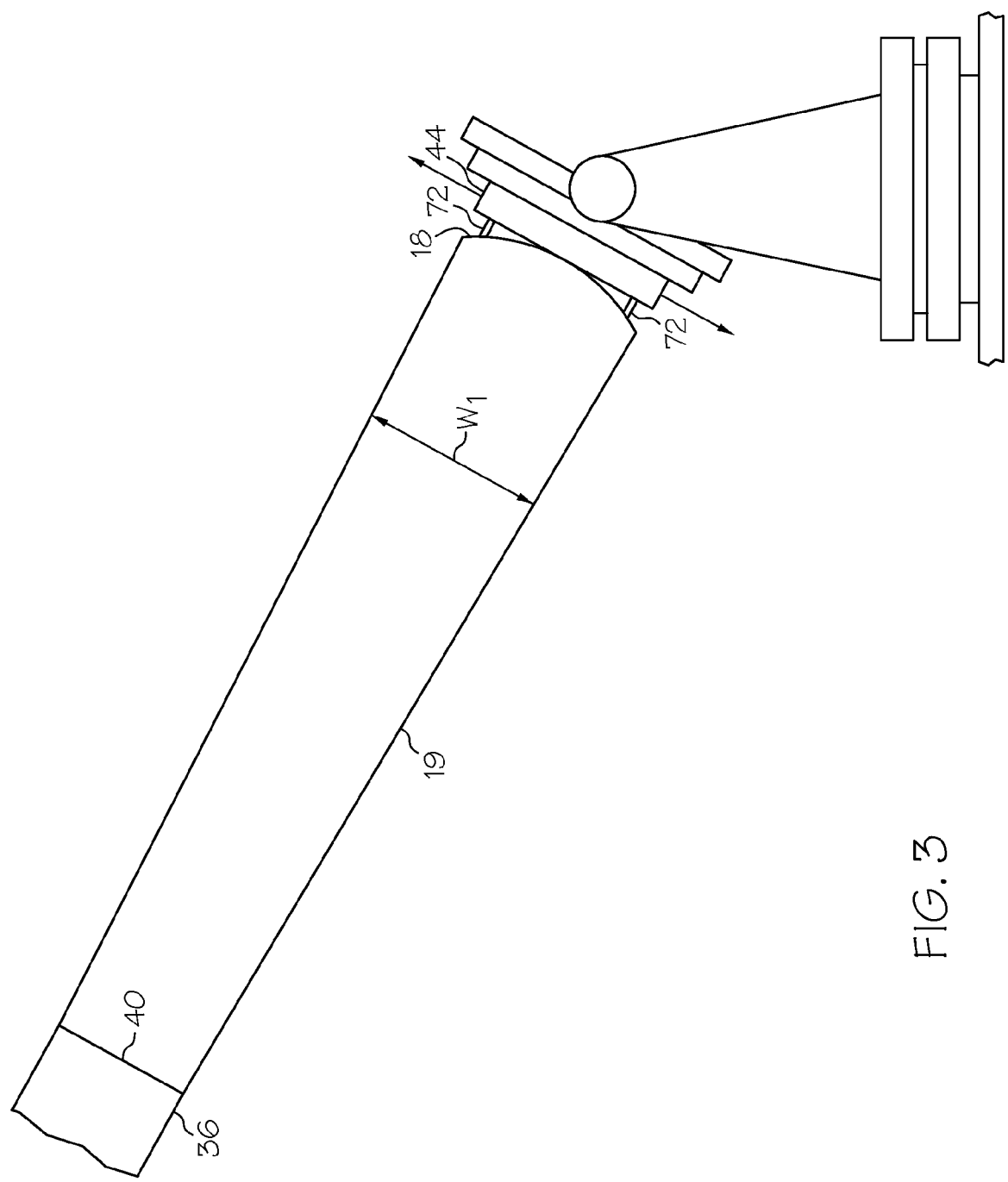
FIG. 3 is a schematic view illustrating a mirror of FIG. 2 configured to reflect a relatively wide focused beam.

FIG. 3 is a schematic view illustrating second mirror 18 while configured to reflect a relatively wide focused beam. In this illustration, second focal length compensator 44 includes a pair of extending members 72 that are positioned to extend and retract in a manner that will bend an outer portion of second mirror 18 away from and towards second focal length compensator 44. In other embodiments, a greater or lesser number of extending members may be employed. As extending members 72 extend outwardly, the curved arc of a reflective surface of second mirror 18 becomes sharper which, in turn, brings the focal point closer to the second mirror 18 and narrows second focused beam 19. Conversely, as extending members 72 retract inwardly, the curved arc of the reflective surface of second mirror 18 becomes flatter, thus moving the focal point further away from the second mirror 18 and widening the width of second focused beam 19. In FIG. 3, extending members 72 are in a relatively retracted position and the reflective surface of second mirror 18 is relatively flat. As a result, second focused beam 19 has a width $W_1$ that is relatively wide. This configuration would be appropriate at times when second aperture 40 of second focal length adjuster 36 is relatively far from second mirror 18.

Figure 4:
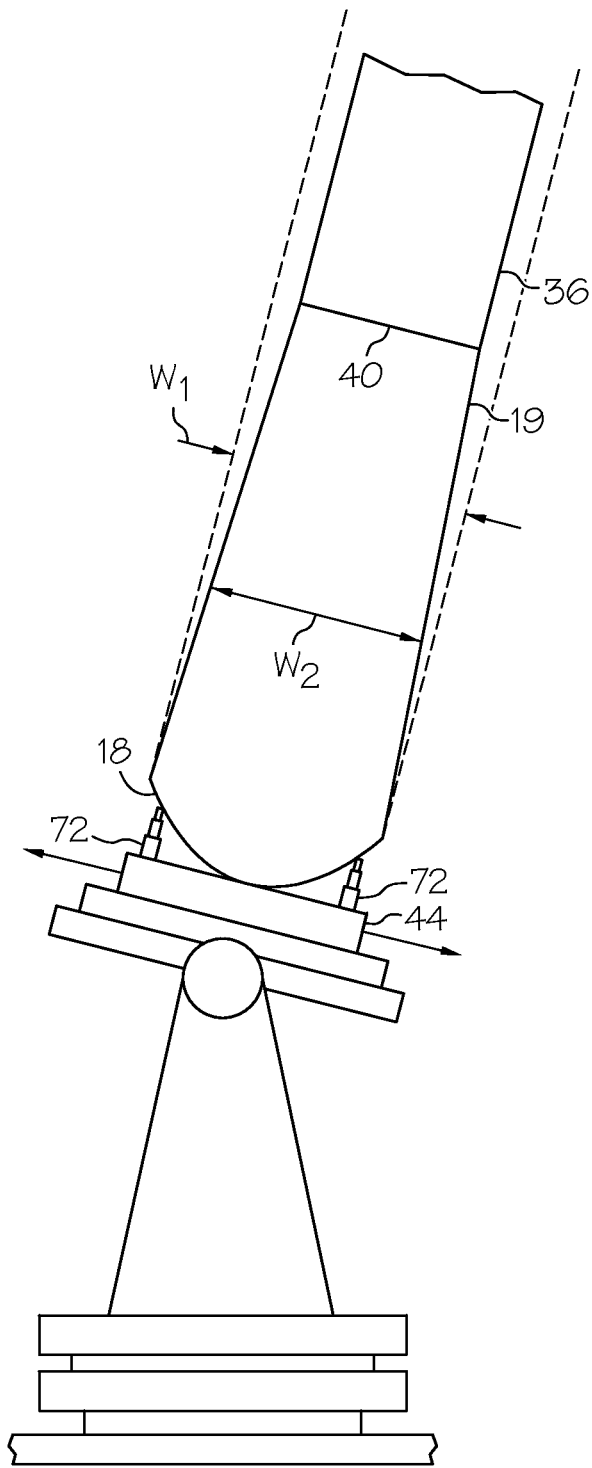
FIG. 4 is a schematic view illustrating the mirror of FIG. 2 configured to reflect a relatively narrow focused beam.

In some embodiments, focal length compensator 44 may also be configured for translation as indicated by the arrows drawn in FIGS. 3 and 4. Such translation has the effect of moving mirror 18 closer to and/or further from second focal length adjuster 36. Such translation may be employed in stead of or in combination with the actions of second focal length compensator 46.

FIG. 4 is a schematic view illustrating second mirror 18 while it is configured to reflect a relatively narrow focused beam. In FIG. 4, second mirror 18 has been slewed from the leftward facing position illustrated in FIG. 3 to a generally overhead orientation. In this orientation, second focal length adjuster 36 is much closer to second mirror 18 than it was in FIG. 3. Consequently, second focused beam 19 must be narrower than in FIG. 3 to pass through second aperture 40. Accordingly, extending members 72 have extended outwardly from second focal length compensator 44 to bend the outward portions of second mirror 18 upward, thus sharpening the curve of the reflective surface of second mirror 18 and thereby narrowing the width of second focused beam 19. As illustrated, in order for second focused bean 19 to pass through second aperture 40, second focused beam 19 must have a width $W_2$. For the sake of comparison, width $W_1$ is illustrated in phantom lines to demonstrate the difference in size between widths $W_1$ and $W_2$.

Although the above discussion of space telescope system 12 has focused on receiving light from remote target 14 to assemble the composite image, it should be understood that space telescope system 12 is not limited to use in collecting light from remote targets, nor is it limited to use in collecting visible light. Space telescope system 12 may also be directed in a nadir pointing direction to observe the earth, other satellites in orbit around the earth, and spacecraft arriving and departing from support platform 10. Additionally, space telescope system 12 may be configured to collect not only visible light, but may also be used to collect and/or transmit laser light for use as part of a laser communication system or to collect and/or transmit any form of electromagnetic radiation for any suitable purpose.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A space telescope system comprising:
   a support platform configured to orbit astronomical object;
   a plurality of mirrors mounted to the support platform and spaced apart from one another, the plurality of mirrors being configured to reflect a plurality of focused beams; and
   a focal plane image combiner positioned to intersect the plurality of focused beams and configured to combine the plurality of focused beams to form a composite image; and
   a plurality of focal length adjusters positioned to intersect the plurality of focused beams, the plurality of focal length adjusters each having an aperture positioned to intersect one of the plurality of focused beams, and being configured to equalize an effective focal length of each focused beam of the plurality of focused beams.

2. The space telescope system of claim 1, further comprising a plurality of focal length compensators connected to the plurality of mirrors, the plurality of focal length compensators being configured to adjust a width of each focused beam of the plurality of focused beams.

3. A space telescope system comprising:
   a support platform configured to orbit astronomical object;
   a first mirror mounted to the support platform, the first mirror configured to reflect a first image in a first focused beam;
   a second mirror mounted to the support platform, the second mirror spaced apart from the first mirror and configured to reflect a second image in a second focused beam;
   a first focal length compensator connected to the first mirror and configured to alter a shape of the first mirror to adjust a first width of the first focused beam;
   a second focal length compensator connected to the second mirror and configured to alter the shape of the second mirror to adjust a second width of the second focused beam;
   a first focal length adjuster having a first aperture positioned to intersect the first focused beam, the first focal length adjuster being configured to adjust a first effective focal length of the first focused beam;
   a second focal length adjuster having a second aperture positioned to intersect the second focused beam, the second focal length adjuster being configured to adjust a second effective focal length of the second focused beam;
   a focal plane image combiner positioned to intersect the first focused beam and the second focused beam after the first focused beam and the second focused beam pass through the first focal length adjuster and the second focal length adjuster, respectively, the focal plane image combiner configured to combine the first image and the second image into a composite image; and
   a processor operatively coupled to the first focal length compensator, to the second focal length compensator, to the first focal length adjuster, to the second focal length adjuster, and to the focal plane image combiner, the processor being configured:
   to control the first focal length compensator to ensure that the first width is sized to fit within the first aperture and to control the second focal length compensator to ensure that the second width is sized to fit within the second aperture,
   to control the first focal length adjuster and the second focal length adjuster to adjust the first effective focal length and the second effective focal length, respectively, to render the first effective focal length and the second effective focal length substantially equal to one another, and to control the focal plane image combiner to combine the first image with the second image to yield the composite image.

4. The space telescope system of claim 3, wherein the first mirror has a first curved surface and the second mirror has a second curved surface, and wherein the first focal length compensator and the second focal length compensator are configured to bend the first curved surface and the second curved surface, respectively.

5. The space telescope system of claim 3, further comprising:
a first vibration isolator associated with the first mirror, the first vibration isolator configured to isolate the first mirror from a vibration originating from the support platform; and
a second vibration isolator associated with the second mirror, the second vibration isolator configured to isolate the second mirror from the vibration originating from the support platform.

6. The space telescope system of claim 3, further comprising:
a first mounting assembly mounting the first mirror to the support platform; and
a second mounting assembly mounting the second mirror to the support platform,
wherein the first mounting assembly and the second mounting assembly each permit azimuth adjustment and elevation adjustment of the first mirror and the second mirror, respectively, and
wherein the processor is operatively connected to the first mounting assembly and the second mounting assembly and is configured to adjust the first mounting assembly and the second mounting assembly in a manner that permits the first mirror and the second mirror to track a distant object.

7. The space telescope system of claim 6, further comprising:
a sensor operatively coupled to the processor, the sensor configured to detect misalignment of the first mirror and the second mirror with the distant object; and
a tip-tilt transmissive element operatively coupled to the processor, the tip-tilt transmissive element configured to provide fine tracking and fine vibration control to the first mirror and the second mirror in a manner that counteracts misalignment detected by the sensor.

8. The space telescope system of claim 6, wherein the focal plane image combiner is configured to rotate about an axis generally transverse to the first and the second focused beam.

9. The space telescope system of claim 8, wherein the support platform is nadir pointing.

10. A space telescope system comprising:
a support platform configured to orbit astronomical object;
a first mirror mounted to the support platform, the first mirror configured to reflect a first image in a first focused beam;
a focal plane mast associated with the first mirror and extending transversely therefrom;
a second mirror mounted to the support platform, the second mirror spaced apart from the first mirror and configured to reflect a second image in a second focused beam;
a second focal length compensator connected to the second mirror and configured to alter a shape of the second mirror to adjust a second width of the second focused beam;
a second focal length adjuster having a second aperture positioned to intersect the second focused beam, the second focal length adjuster being configured to adjust a second effective focal length of the second focused beam;
a focal plane image combiner mounted on the focal plane mast and positioned to intersect the first focused beam and to intersect the second focused beam after the second focused beam passes through the second focal length adjuster, the focal plane image combiner configured to combine the first image and the second image into a composite image; and
a processor operatively coupled to the second focal length compensator, to the second focal length adjuster, and to the focal plane image combiner, the processor being configured:
to control the second focal length compensator to ensure that the second width is sized to fit within the second aperture,
to control the second focal length adjuster to adjust the second effective focal length to be substantially equal to a first focal length extending from the first mirror to the focal plane image combiner, and
to control the focal plane image combiner to combine the first image with the second image to yield the composite image.

11. The space telescope system of claim 10, further comprising a prime focus assembly mounted to an end of the focal plane mast, wherein the focal plane image combiner is mounted within the prime focus assembly and wherein the prime focus assembly includes a sensor to determine whether the first mirror and the second mirror have become misaligned with a distant object.

12. The space telescope system of claim 10, wherein the focal plane mast is attached to the first mirror.

13. The space telescope system of claim 10, wherein the focal plane mast extends from an approximate center of the first mirror.

14. The space telescope system of claim 10, wherein the second mirror has a second curved surface and wherein the second focal length compensator is configured to bend the second curved surface.

15. The space telescope system of claim 11, further comprising:
a first vibration isolator associated with the first mirror, the first vibration isolator configured to isolate the first mirror from a vibration originating from the support platform; and
a second vibration isolator associated with the second mirror, the second vibration isolator configured to isolate the second mirror from the vibration originating from the support platform.

16. The space telescope system of claim 10, further comprising:
a first mounting assembly mounting the first mirror to the support platform; and
a second mounting assembly mounting the second mirror to the support platform,
wherein the first mounting assembly and the second mounting assembly each permit azimuth adjustment and elevation adjustment of the first mirror and the second mirror, respectively, and
wherein the processor is operatively connected to the first mounting assembly and the second mounting assembly and is configured to adjust the first mounting assembly and the second mounting assembly in a manner that permits the first mirror and the second mirror to track a distant object.

17. The space telescope system claim 16, further comprising a sensor operatively coupled to the processor, the sensor configured to detect misalignment of the first mirror and the second mirror with the distant object.

18. The space telescope system of claim 16, wherein the focal plane image combiner is configured to rotate about an axis generally transverse to the focal plane mast.

19. The space telescope system of claim 18, wherein the support platform is nadir pointing.

* * * * *